(12) United States Patent
Whiting

(10) Patent No.: US 6,945,048 B2
(45) Date of Patent: Sep. 20, 2005

(54) EXHAUST PRESSURE RESTRICTION DEVICE WITH BYPASS PASSAGEWAY

(75) Inventor: Todd Matthew Whiting, Waterloo, IA (US)

(73) Assignee: Deere & Company, Moline, IL (US)

( * ) Notice: Subject to any disclaimer, the term of this patent is extended or adjusted under 35 U.S.C. 154(b) by 32 days.

(21) Appl. No.: 10/696,785

(22) Filed: Oct. 30, 2003

(65) Prior Publication Data

US 2005/0091976 A1 May 5, 2005

(51) Int. Cl.$^7$ .......................... F02B 37/18; F02D 23/00; F02M 25/06
(52) U.S. Cl. ...................................... 60/602; 123/559.1
(58) Field of Search .......................... 60/602; 123/559.1

(56) References Cited

U.S. PATENT DOCUMENTS

| | | | | |
|---|---|---|---|---|
| 4,075,990 A | * | 2/1978 | Ribeton ................... | 123/559.1 |
| 4,561,253 A | * | 12/1985 | Curtil ...................... | 123/559.1 |
| 5,553,575 A | * | 9/1996 | Beck et al. .............. | 123/198 F |
| 5,857,337 A | * | 1/1999 | Kawasaki ..................... | 60/602 |
| 5,943,864 A | * | 8/1999 | Sumser et al. ................ | 60/602 |
| 5,996,347 A | * | 12/1999 | Nagae et al. ................. | 60/602 |
| 6,381,960 B1 | * | 5/2002 | Mardberg ..................... | 60/602 |
| 6,598,584 B2 | * | 7/2003 | Beck et al. .................... | 60/599 |
| 6,732,522 B2 | * | 5/2004 | Wright et al. ................. | 60/602 |
| 2001/0017033 A1 | | 8/2001 | McKinley et al. ......... | 60/605.2 |

* cited by examiner

Primary Examiner—Sheldon J Richter

(57) ABSTRACT

An exhaust pressure restriction device with bypass passageway is provided. The device comprises a turbocharger having a turbine portion, a restrictor fitting and a bypass fitting. The turbine includes an exhaust gas inlet, a turbine wheel, an exhaust gas outlet and a waste gate valve. The restrictor fitting comprises an exhaust gas inlet, an exhaust gas outlet and an orifice disposed between the exhaust gas inlet and the exhaust gas outlet. The restrictor fitting is mated to the turbine such that the exhaust inlet of the restrictor fitting communicates with the exhaust outlet of the turbine. The bypass fitting has an exhaust gas inlet, an exhaust gas outlet, and a bypass passageway. The exhaust gas outlet of the bypass fitting is adapted to communicate with the exhaust system of the vehicle and to be matingly fitted to both the restrictor fitting and the turbine. The exhaust gas inlet of the bypass fitting communicates with the exhaust gas outlet of the restrictor fitting, while the bypass passageway communicates with the waste gate of the turbine. The exhaust inlet of the turbine is connected to the exhaust manifold of an internal combustion engine. In operation during the peak torque condition of the engine the waste gate valve is closed so that all exhaust gases engage the turbine wheel, the gas then exits the turbine at the exhaust outlet through the orifice of the restrictor fitting and out the exhaust outlet of the bypass fitting. Because the waste gate is closed no gas is allowed to bypass the restrictor orifice. The size of the orifice is selected to create enough back pressure at the peak torque condition to attain the desired level of negative delta P necessary to drive EGR. As the speed of the engine increases the waste gate valve opens allowing a portion of the exhaust gases to bypass the turbine wheel. This gas is then also routed around the restrictor orifice via the bypass passageway thereby lowering the back pressure because the waste gated gases are not subject to the flow restriction caused by the restrictor fitting. Thus negative delta P at rated speed is reduced so as to improve fuel economy at this critical operating point while still maintaining a level adequate to drive EGR.

26 Claims, 1 Drawing Sheet

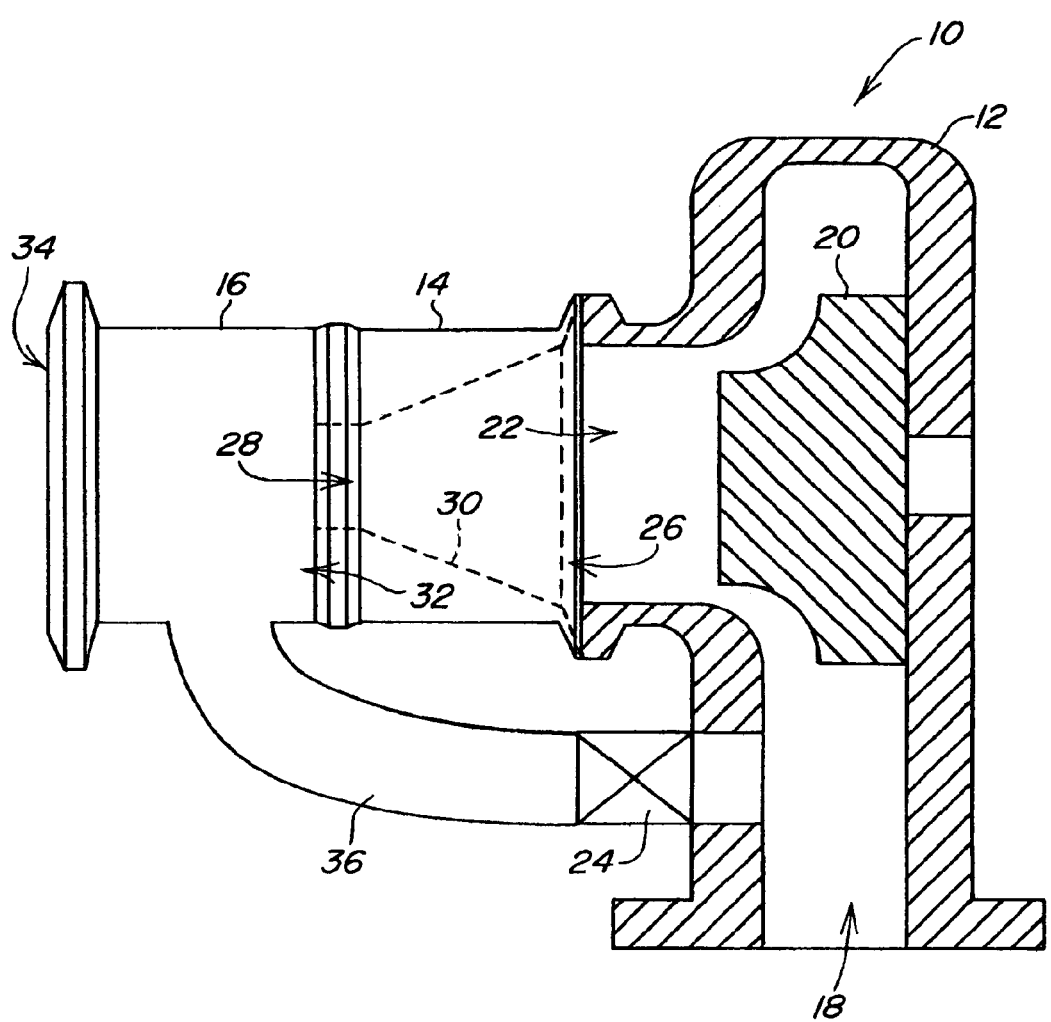

EXHAUST PRESSURE RESTRICTION DEVICE WITH BYPASS PASSAGEWAY

FIELD OF THE INVENTION

The present invention relates generally to turbocharged diesel internal combustion engines. More particularly, the present invention relates to such engines which employ external exhaust gas recirculation (EGR). Specifically, the present invention relates to such engines having an exhaust pressure restriction device for driving EGR.

BACKGROUND OF THE INVENTION

In recent years it has become desirable to reduce emissions from internal combustion engines. Numerous environmental regulations have been enacted mandating that engine manufacturers take steps necessary to reduce environmentally harmful emissions. One common method to reduce engine emissions is to employ external exhaust gas recirculation (EGR) wherein a portion of the exhaust gases produced by the engine are reintroduced into the intake of the engine for further combustion. In order to drive external EGR to flow it is necessary to create a higher pressure in the exhaust manifold than in the intake manifold. This is not a natural trend for internal combustion engines and particularly turbocharged diesel engines wherein the intake manifold pressure is frequently higher than the exhaust pressure. In order to create a higher pressure in the exhaust manifold compared to the intake manifold, a condition known as negative delta P, it is typically necessary to provide additional hardware to the basic engine. The objective of this hardware is to create a restriction someplace in the exhaust system so as to significantly raise the pressure in the exhaust manifold. One currently favored approach for accomplishing this is to employ a variable geometry turbocharger. These devices can be closed down to effectively restrict the flow of gases from the engine thereby inducing a buildup of pressure in the exhaust manifold. The variable geometry turbocharger is able to accomplish this task, albeit at a significantly added product cost and with high concern for reliability problems.

Another problem in creating the needed negative delta P is that the engine naturally develops a high level of positive delta P at full load and lower engine speed (peak torque). Accordingly, the amount of restriction required in the exhaust system at peak torque must be very high to induce negative delta P. If a fixed restriction device is employed for the peak torque condition the back pressure created at full load rated speed will be excessively high and will significantly degrade the fuel economy of the engine at full load rated speed.

Accordingly, there is a clear need in the art for an exhaust restriction device which is capable of creating the needed backpressure at peak torque, but not excessively penalizing fuel economy due to excessive back pressure at the rated speed full load condition.

SUMMARY OF THE INVENTION

In view of the foregoing, it is an object of the invention to provide means to drive external EGR in a turbocharged internal combustion engine.

Another object of the invention is the provision of such means without the need for a variable geometry turbocharger.

A further object of the invention is to provide enough back pressure at peak torque to induce negative delta P.

An additional object of the invention is the provision of such means without creating excessive backpressure at full load rated speed.

A further object of the present invention is to provide such means which is compatible with existing engine designs.

A still further object of the present invention is to provide such means which is inexpensive to produce and is compatible with existing manufacturing techniques and equipment.

The foregoing and other objects of the invention together with the advantages thereof over the known art which will become apparent from the detailed specification which follows are attained by an exhaust pressure restriction device for an internal combustion engine comprising: a turbocharger having a turbine, the turbine having an exhaust gas inlet connected to an exhaust manifold of the internal combustion engine, a turbine wheel drivingly engaging a compressor of the turbocharger, an exhaust gas outlet; a waste gate valve in communication with the exhaust gas inlet; a restrictor fitting having an exhaust gas inlet, an exhaust gas outlet and a restrictor orifice disposed between the exhaust gas inlet and the exhaust gas outlet, the restrictor fitting being mated to the turbine such that the exhaust inlet of the restrictor fitting is disposed for communication with the exhaust gas outlet of the turbine; and, a bypass fitting having an exhaust gas inlet, an exhaust gas outlet, and a bypass passageway, the bypass fitting being coupled to both the restrictor fitting and the turbine such that the exhaust gas inlet of the bypass fitting is disposed for communication with the exhaust gas outlet of the restrictor fitting, and the bypass passageway is disposed for communication with the waste gate valve.

In general, an exhaust pressure restriction device with bypass passageway is provided. The device comprises a turbocharger having a turbine portion, a restrictor fitting and a bypass fitting. The turbine includes an exhaust gas inlet, a turbine wheel, an exhaust gas outlet and a waste gate valve. The restrictor fitting comprises an exhaust gas inlet, an exhaust gas outlet and an orifice disposed between the exhaust gas inlet and the exhaust gas outlet. The restrictor fitting is mated to the turbine such that the exhaust inlet of the restrictor fitting communicates with the exhaust outlet of the turbine. The bypass fitting has an exhaust gas inlet, an exhaust gas outlet, and a bypass passageway. The exhaust gas outlet of the bypass fitting is adapted to communicate with the exhaust system of the vehicle and to be matingly fitted to both the restrictor fitting and the turbine. The exhaust gas inlet of the bypass fitting communicates with the exhaust gas outlet of the restrictor fitting, while the bypass passageway communicates with the waste gate of the turbine. The exhaust inlet of the turbine is connected to the exhaust manifold of an internal combustion engine. In operation during the peak torque condition of the engine the waste gate valve is closed so that all exhaust gases engage the turbine wheel, the gas then exits the turbine at the exhaust outlet through the orifice of the restrictor fitting and out the exhaust outlet of the bypass fitting. Because the waste gate is closed no gas is allowed to bypass the restrictor orifice. The size of the orifice is selected to create enough back pressure at the peak torque condition to attain the desired level of negative delta P necessary to drive EGR. As the speed of the engine increases the waste gate valve opens allowing a portion of the exhaust gases to bypass the turbine wheel. This gas is then also routed around the restrictor orifice via the bypass passageway thereby lowering the back pressure because the waste gated gases are not subject to the flow restriction caused by the restrictor fitting. Thus negative delta P at rated speed is reduced so as to improve fuel economy at this critical operating point while still maintaining a level adequate to drive EGR.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 is a plan view, partially in cross-section, of a turbocharger embodying the concept of the present invention.

DESCRIPTION OF THE PREFERRED EMBODIMENT

With reference now to the drawing it can be seen that an exhaust pressure restriction device with bypass passageway according to the invention is designated generally by the numeral 10. As shown the device 10 is comprised generally of a turbine 12, a restrictor fitting 14 and a bypass fitting 16. The turbine 12 includes an exhaust gas inlet 18, a turbine wheel 20, an exhaust gas outlet 22 and a waste gate valve 24. The restrictor fitting 14 comprises an exhaust gas inlet 26, an exhaust gas outlet 28 and an orifice 30 disposed between the exhaust gas inlet 26 and the exhaust gas outlet 28. The restrictor fitting 14 is adapted to be mated to the turbine 12 such that the exhaust inlet 26 of the restrictor fitting 14 is disposed for communication with the exhaust outlet 22 of the turbine 12. Accordingly, the restrictor fitting 14 and turbine 12 may be provided with mounting flanges or other appropriate means for connecting the fitting 14 to the turbine 12. The bypass fitting 16 has an exhaust gas inlet 32, an exhaust gas outlet 34, and a bypass passageway 36. The exhaust outlet 34 of the bypass fitting 16 is adapted to be fitted for communication with the exhaust discharge system of the vehicle (not shown). The bypass fitting 16 is further adapted to be matingly fitted to both the restrictor fitting 14 and the turbine 12. Specifically, the exhaust gas inlet 32 of the bypass fitting 16 is disposed for direct communication with the exhaust gas outlet 28 of the restrictor fitting 14, while the bypass passageway 36 is disposed for direct communication with the waste gate 24 of the turbine 12. Thus it is contemplated that the bypass fitting 16, restrictor fitting 14 and turbine 12 can be provided with mounting flanges or other appropriate means for making the necessary connections. It is further contemplated that the restrictor fitting 14 and bypass fitting 16 could be manufactured as a unitary part which could be mounted to the turbine 12 using appropriate means, or the restrictor fitting 14 and bypass fitting 16 could be integrated into the housing of the turbine 12. Similarly, it is contemplated that the waste gate 24 could be integrated into the exhaust manifold The exhaust inlet 18 of the turbine 12 is connected to the exhaust manifold of an internal combustion engine (not shown) and the turbine wheel 20 of the turbine 12 drivingly engages a compressor portion (not shown) of the turbocharger in a conventional fashion. The exhaust outlet 22 of the turbine 12 is connected to the exhaust discharge system of the vehicle (not shown) via the restrictor fitting 14 and bypass fitting 16 as described above. In operation during the peak torque condition of the engine the waste gate valve 24 will be closed so that all exhaust gases pass by the turbine wheel 20 thus driving the compressor, the gas then exits the turbine 12 at the exhaust outlet 22 through the orifice 30 of the restrictor fitting 14 and out the exhaust outlet 34 of the bypass fitting 16. Because the waste gate valve 24 is closed no gas is allowed to bypass the restrictor orifice 30. The size of the orifice 30 of the restrictor fitting 14 is selected to create enough back pressure at the peak torque condition to attain the desired level of negative delta P necessary to drive EGR. As the speed of the engine increases the waste gate valve 24 opens allowing a portion of the exhaust gases to bypass the turbine wheel 20. This gas is also routed around the restrictor orifice 30 via the bypass passageway 36 thereby lowering the back pressure because the waste gated gases are not subject to the flow restriction caused by the restrictor fitting 14. Thus negative delta P at rated speed is reduced so as to improve fuel economy at this critical operating point while still maintaining a level adequate to drive EGR. While it is most desirable to have the waste gate valve 24 closed during the peak torque condition and opened during the rated speed condition, it is contemplated that it may be useful to utilize the bypass device 10 at other specific times to attain optimal delta P at other specific operating conditions. It is only necessary in such instances to open the waste gate valve 24 at the appropriate time in response to the desired operating condition.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. An exhaust pressure restriction device for an internal combustion engine comprising:

a turbocharger having a turbine, the turbine having an exhaust gas inlet connected to an exhaust manifold of the internal combustion engine, a turbine wheel drivingly engaging a compressor of the turbocharger, an exhaust gas outlet;

a waste gate valve in communication with the exhaust gas inlet;

a restrictor fitting having an exhaust gas inlet, an exhaust gas outlet and a restrictor orifice disposed between the exhaust gas inlet and the exhaust gas outlet, the restrictor fitting being mated to the turbine such that the exhaust inlet of the restrictor fitting is disposed for communication with the exhaust gas outlet of the turbine; and, a bypass fitting having an exhaust gas inlet, an exhaust gas outlet, and a bypass passageway, the bypass fitting being coupled to both the restrictor fitting and the turbocharger such that the exhaust gas inlet of the bypass fitting is disposed for communication with the exhaust gas outlet of the restrictor fitting, and the bypass passageway is disposed for communication with the waste gate valve, and wherein the restrictor fitting and bypass fitting are manufactured as a unitary part which is mounted to the turbine.

2. An exhaust pressure restriction device for an internal combustion engine as described in claim 1 wherein the restrictor fitting and turbine are provided with means for connecting the restrictor fitting to the turbocharger.

3. An exhaust pressure restriction device for an internal combustion engine as described in claim 1 wherein the exhaust outlet of the bypass fitting is fitted for communication with an exhaust discharge system of a vehicle.

4. An exhaust pressure restriction device for an internal combustion engine as described in claim 1 wherein the bypass fitting, restrictor fitting and turbine are provided with means for connecting the bypass fitting to the restrictor fitting and the turbocharger.

5. An exhaust pressure restriction device for an internal combustion engine as described in claim 1 wherein the exhaust gas outlet of the turbine is connected to the exhaust discharge system of the vehicle via the restrictor fitting and bypass fitting.

6. An exhaust pressure restriction device for an internal combustion engine as described in claim 1 wherein the waste gate is integrated into the turbine housing.

7. An exhaust pressure restriction device for an internal combustion engine as described in claim 1 wherein the waste gate is integrated into the exhaust manifold.

8. An exhaust pressure restriction device for an internal combustion engine as described in claim 1 wherein during a peak torque condition of the engine the waste gate valve is closed so that all exhaust gases are routed to the turbine wheel thus driving the compressor, the gases then exit the turbine at the exhaust gas outlet through the restrictor orifice of the restrictor fitting and out the exhaust gas outlet of the bypass fitting.

9. An exhaust pressure restriction device for an internal combustion engine as described in claim 8 wherein the size of the restrictor orifice of the restrictor fitting is selected to create enough back pressure at the peak torque condition to attain a desired level of negative delta P necessary to drive exhaust gas recirculation (EGR), wherein delta P is defined as the difference in pressure between the exhaust manifold of the engine and an intake manifold of the engine and a negative delta P represents a higher pressure in the exhaust manifold than in the intake manifold.

10. An exhaust pressure restriction device for an internal combustion engine as described in claim 9 wherein as the speed of the engine increases the waste gate valve opens allowing a portion of the exhaust gases to bypass the turbine wheel and the restrictor orifice via the bypass passageway thereby lowering the back pressure, whereby the negative delta P at rated speed full load is reduced so as to improve fuel economy at the rated speed full load operating point while still maintaining a level adequate to drive EGR.

11. An exhaust pressure restriction device for an internal combustion engine as described in claim 1 wherein the waste gate valve is selectively opened and closed based upon an operating condition of the engine and when closed all exhaust gases are routed to the turbine wheel thus driving the compressor, the gases then exit the turbine at the exhaust gas outlet through the restrictor orifice of the restrictor fitting and out the exhaust gas outlet of the bypass fitting.

12. An exhaust pressure restriction device for an internal combustion engine as described in claim 11 wherein the size of the restrictor orifice of the restrictor fitting is selected to create enough back pressure at a specific operating condition to attain the desired level of negative delta P necessary to drive exhaust gas recirculation (EGR), wherein delta P is defined as the difference in pressure between the exhaust manifold of the engine and an intake manifold of the engine and a negative delta P represents a higher pressure in the exhaust manifold than in the intake manifold.

13. An exhaust pressure restriction device for an internal combustion engine as described in claim 12 wherein when the waste gate valve is opened a portion of the exhaust gases are allowed to bypass the turbine wheel and the restrictor orifice via the bypass passageway thereby lowering the back pressure, whereby the negative delta P is reduced.

14. An exhaust pressure restriction device for an internal combustion engine comprising:
   a turbocharger having a turbine, the turbine having an exhaust gas inlet connected to an exhaust manifold of the internal combustion engine, a turbine wheel drivingly engaging a compressor of the turbocharger, an exhaust gas outlet;
   a waste gate valve in communication with the exhaust gas inlet;
   a restrictor fitting having an exhaust gas inlet, an exhaust gas outlet and a restrictor orifice disposed between the exhaust gas inlet and the exhaust gas outlet, the restrictor fitting being mated to the turbine such that the exhaust inlet of the restrictor fitting is disposed for communication with the exhaust gas outlet of the turbine; and,
   a bypass fitting having an exhaust gas inlet, an exhaust gas outlet, and a bypass passageway, the bypass fitting being coupled to both the restrictor fitting and the turbocharger such that the exhaust gas inlet of the bypass fitting is disposed for communication with the exhaust gas outlet of the restrictor fitting, and the bypass passageway is disposed for communication with the waste gate valve, and wherein the restrictor fitting and bypass fitting are integrated into a housing of the turbine.

15. An exhaust press restriction device for an internal combustion engine as described in claim 14 wherein the restrictor fitting and turbine are provided with means for connecting the restrictor fitting to the turbocharger.

16. An exhaust pressure restriction device for an internal combustion engine as described in claim 14 wherein the exhaust outlet of the bypass fitting is fitted for communication with an exhaust discharge system of a vehicle.

17. An exhaust pressure restriction device for an internal combustion engine as described in claim 14 wherein the bypass fitting, restrictor fitting and turbine are provided with means for connecting the bypass fitting to the restrictor fitting and the turbocharger.

18. An exhaust pressure restriction device for an internal combustion engine as described in claim 14 wherein the exhaust gas outlet of the turbine is connected to the exhaust discharge system of the vehicle via the restrictor fitting and bypass fitting.

19. An exhaust pressure restriction device for an internal combustion engine as described in claim 14 wherein the waste gate is integrated into the turbine housing.

20. An exhaust pressure restriction device for an internal combustion engine as described in claim 14 wherein the waste gate is integrated into the exhaust manifold.

21. An exhaust pressure restriction device for an internal combustion engine as described in claim 14 wherein during a peak torque condition of the engine the waste gate valve is closed so that all exhaust gases are routed to the turbine wheel thus driving the compressor, the gases then exit the turbine at the exhaust gas outlet through the restrictor orifice of the restrictor fitting and out the exhaust gas outlet of the bypass fitting.

22. An exhaust pressure restriction device for an internal combustion engine as described in claim 21 wherein the size of the restrictor orifice of the restrictor fitting is selected to create enough back pressure at the peak torque condition to attain a desired level of negative delta P necessary to drive exhaust gas recirculation (EGR), wherein delta P is defined as the difference in pressure between the exhaust manifold of the engine and an intake manifold of the engine and a negative delta P represents a higher pressure in the exhaust manifold than in the intake manifold.

23. An exhaust pressure restriction device for an internal combustion engine as described in claim 22 wherein as the speed of the engine increases the waste gate valve opens allowing a portion of the exhaust gases to bypass the turbine wheel and the restrictor orifice via the bypass passageway thereby lowering the back pressure, whereby the negative delta P at rated speed full load is reduced so as to improve fuel economy at the rated speed full load operating point while still maintaining a level adequate to drive EGR.

24. An exhaust pressure restriction device for an internal combustion engine as described in claim 14 wherein the waste gate valve is selectively opened and closed based upon an operating condition of the engine and when closed all exhaust gases are routed to the turbine wheel thus driving the compressor, the gases then exit the turbine at the exhaust gas outlet through the restrictor orifice of the restrictor fitting and out the exhaust gas outlet of the bypass fitting.

25. An exhaust pressure restriction device for an internal combustion engine as described in claim 24 wherein the size of the restrictor orifice of the restrictor fitting is selected to create enough back pressure at a specific operating condition to attain the desired level of negative delta P necessary to drive exhaust gas recirculation (EGR), wherein delta P is defined as the difference in pressure between the exhaust manifold of the engine and an intake manifold of the engine and a negative delta P represents a higher pressure in the exhaust manifold than in the intake manifold.

26. An exhaust pressure restriction device for an internal combustion engine as described in claim 25 wherein when the waste gate valve is opened a portion of the exhaust gases are allowed to bypass the turbine wheel and the restrictor orifice via the bypass passageway thereby lowering the back pressure, whereby the negative delta P is reduced.

* * * * *